(12) United States Patent
Nigo et al.

(10) Patent No.: US 11,018,535 B2
(45) Date of Patent: May 25, 2021

(54) MOTOR, ROTOR, COMPRESSOR, AND REFRIGERATION AND AIR CONDITIONING APPARATUS

(71) Applicant: Mitsubishi Electric Corporation, Tokyo (JP)

(72) Inventors: Masahiro Nigo, Tokyo (JP); Yuji Hirosawa, Tokyo (JP); Ryukichi Kijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 212 days.

(21) Appl. No.: 15/758,024

(22) PCT Filed: Nov. 2, 2015

(86) PCT No.: PCT/JP2015/080956
§ 371 (c)(1),
(2) Date: Mar. 7, 2018

(87) PCT Pub. No.: WO2017/077580
PCT Pub. Date: May 11, 2017

(65) Prior Publication Data
US 2018/0248428 A1    Aug. 30, 2018

(51) Int. Cl.
*H02K 1/27* (2006.01)
*H02K 1/02* (2006.01)
(Continued)

(52) U.S. Cl.
CPC ....... *H02K 1/2766* (2013.01); *F04C 29/0085* (2013.01); *F25B 1/04* (2013.01);
(Continued)

(58) Field of Classification Search
CPC .......... F25B 1/04; F25B 31/026; F04C 18/30; F04C 2240/40; F04C 29/0085;
(Continued)

(56) References Cited

U.S. PATENT DOCUMENTS

2002/0051715 A1*  5/2002  Matsumoto .............. H02K 5/24
                                                              417/410.3
2007/0126304 A1*  6/2007  Ito ........................ H02K 1/2766
                                                              310/156.53
(Continued)

FOREIGN PATENT DOCUMENTS

CN        101938172 A        1/2011
CN        201754534 U        3/2011
(Continued)

OTHER PUBLICATIONS

International Search Report of the International Searching Authority dated Dec. 8, 2015 for the corresponding international application No. PCT/JP2015/080956 (and English translation).
(Continued)

*Primary Examiner* — Alex W Mok
(74) *Attorney, Agent, or Firm* — Posz Law Group, PLC

(57) ABSTRACT

A motor includes a stator and a rotor provided inside the stator. The rotor includes a rotor core having a magnet insertion hole and two permanent magnets disposed in the magnet insertion hole. The rotor core has a first magnet holding portion disposed between the two permanent magnets and holding the two permanent magnets, an opening disposed on an inner side of the first magnet holding portion in a radial direction of the rotor core, and a center hole disposed at a center of the rotor core in the radial direction. A distance from the opening to the magnet insertion hole is shorter than a distance from the opening to the center hole.

15 Claims, 14 Drawing Sheets

(51) Int. Cl.
  *H01F 1/057* (2006.01)
  *F04C 29/00* (2006.01)
  *F25B 31/02* (2006.01)
  *F25B 1/04* (2006.01)
  *F04C 18/30* (2006.01)

(52) U.S. Cl.
  CPC ........... *F25B 31/026* (2013.01); *H01F 1/057* (2013.01); *H02K 1/02* (2013.01); *H02K 1/27* (2013.01); *F04C 18/30* (2013.01); *F04C 2240/40* (2013.01); *H02K 2201/09* (2013.01)

(58) Field of Classification Search
  CPC . H01F 1/057; H02K 1/02; H02K 1/27; H02K 1/2766; H02K 2201/09; H02K 1/276; H02K 1/28; H02K 21/14; H02K 2201/03; H02K 2213/03
  USPC ..................................... 310/156.53
  See application file for complete search history.

(56) References Cited

U.S. PATENT DOCUMENTS

| | | | | |
|---|---|---|---|---|
| 2013/0020889 | A1* | 1/2013 | Yamamoto | H02K 1/2766 310/59 |
| 2013/0119807 | A1 | 5/2013 | Nakada | |
| 2013/0154425 | A1 | 6/2013 | Nakada | |
| 2013/0187486 | A1* | 7/2013 | Lee | H02K 5/02 310/43 |
| 2013/0257210 | A1 | 10/2013 | Hattori et al. | |
| 2014/0084731 | A1* | 3/2014 | Iwami | H02K 1/278 310/156.07 |
| 2014/0145538 | A1 | 5/2014 | Date et al. | |
| 2015/0137650 | A1 | 5/2015 | Takahashi | |
| 2016/0149450 | A1 | 5/2016 | Horii et al. | |
| 2018/0248426 | A1 | 8/2018 | Nigo et al. | |

FOREIGN PATENT DOCUMENTS

| | | |
|---|---|---|
| CN | 103026587 A | 4/2013 |
| CN | 108352737 A | 7/2018 |
| EP | 2 270 955 A2 | 1/2011 |
| JP | H06-070520 A | 3/1994 |
| JP | 2010-206882 A | 9/2010 |
| JP | 2011-015500 A | 1/2011 |
| JP | 2012-217249 A | 11/2012 |
| JP | 2012-223009 A | 11/2012 |
| JP | 2012-227993 A | 11/2012 |
| JP | 2013-212035 A | 10/2013 |
| JP | 2014-107913 A | 6/2014 |
| JP | 2015-097437 A | 5/2015 |
| WO | 2012/014728 A1 | 2/2012 |
| WO | 2012/014834 A1 | 2/2012 |
| WO | 2015/019402 A1 | 2/2015 |

OTHER PUBLICATIONS

Office Action dated Jun. 21, 2019 issued in corresponding CN patent application No. 201580083756.X (and English translation).
Office Action dated Dec. 25, 2019 issued in corresponding CN patent application No. 201580083756.X (and English translation).

* cited by examiner

MOTOR, ROTOR, COMPRESSOR, AND REFRIGERATION AND AIR CONDITIONING APPARATUS

CROSS REFERENCE TO RELATED APPLICATION

This application is a U.S. national stage application of International Patent Application No. PCT/JP2015/080956 filed on Nov. 2, 2015, the disclosure of which is incorporated herein by reference.

TECHNICAL FIELD

The present invention relates to a permanent magnet embedded type motor, a rotor of the motor, and a compressor and a refrigeration and air conditioning apparatus using the motor.

BACKGROUND ART

Conventionally, a motor in which permanent magnets are mounted on a rotor is known. This kind of motor is broadly classified as a surface magnet type motor (see, for example, patent reference 1) in which permanent magnets are attached to a surface of a rotor, or a permanent magnet embedded type motor in which permanent magnets are embedded in a rotor. In the permanent magnet embedded type motor, magnet insertion holes are formed in a rotor core, and the permanent magnets are disposed in the magnet insertion holes. A magnet holding portion (a protrusion) is provided in the magnet insertion hole for positioning the permanent magnet so as to prevent the permanent magnet from moving in the magnet insertion hole.

PATENT REFERENCE

PATENT REFERENCE 1: Japanese Patent Application Publication No. H6-70520 (see FIG. 2)

However, the magnet holding portion is formed of the same magnetic material as the rotor core, and thus magnetic flux from a stator tends to flow through the magnet holding portion when the motor is driven. Therefore, an end portion of the permanent magnet adjacent to the magnet holding portion tends to be demagnetized.

SUMMARY

The present invention is intended to solve the above described problem, and an object of the present invention is to suppress demagnetization of the permanent magnet.

A motor of the present invention includes a stator and a rotor provided inside the stator. The rotor includes a rotor core having a plurality of magnet insertion holes arranged in a circumferential direction, each of the magnet insertion holes corresponding to a magnetic pole, and a plurality of permanent magnets provided so that at least two permanent magnets are disposed in each magnet insertion hole. The rotor core further has a first magnet holding portion disposed between the permanent magnets adjacent to each other in the magnet insertion hole, an opening disposed on an inner side of the first magnet holding portion in a radial direction of the rotor core, and a center hole disposed at a center of the rotor core in the radial direction. A distance from the opening to the magnet insertion hole is shorter than a distance from the opening to the center hole.

A rotor of the present invention includes a rotor core having a plurality of magnet insertion holes arranged in a circumferential direction, each of the magnet insertion holes corresponding to a magnetic pole, and a plurality of permanent magnets provided so that at least two permanent magnets are disposed in each magnet insertion hole. The rotor core further has a first magnet holding portion disposed between the permanent magnets adjacent to each other in the magnet insertion hole, an opening disposed on an inner side of the first magnet holding portion in a radial direction of the rotor core, and a center hole disposed at a center of the rotor core in the radial direction. A distance from the opening to the magnet insertion hole is shorter than a distance from the opening to the center hole.

A compressor of the present invention includes a motor and a compression mechanism driven by the motor. The motor includes a stator, and a rotor provided inside the stator. The rotor includes a rotor core having a plurality of magnet insertion holes arranged in a circumferential direction, each of the magnet insertion holes corresponding to a magnetic pole, and a plurality of permanent magnets provided so that at least two permanent magnets are disposed in each magnet insertion hole. The rotor core further has a first magnet holding portion disposed between the permanent magnets adjacent to each other in the magnet insertion hole, an opening disposed on an inner side of the first magnet holding portion in a radial direction of the rotor core, and a center hole disposed at a center of the rotor core in the radial direction. A distance from the opening to the magnet insertion hole is shorter than a distance from the opening to the center hole.

A refrigeration and air conditioning apparatus of the present invention includes a compressor, a condenser, a decompression device, and an evaporator. The compressor includes a motor and a compression mechanism driven by the motor. The motor includes a stator and a rotor provided inside the stator. The rotor includes a rotor core having a plurality of magnet insertion holes arranged in a circumferential direction, each of the magnet insertion holes corresponding to a magnetic pole, and a plurality of permanent magnets provided so that at least two permanent magnets are disposed in each magnet insertion hole. The rotor core further has a first magnet holding portion disposed between the permanent magnets adjacent to each other in the magnet insertion hole, an opening disposed on an inner side of the first magnet holding portion in a radial direction of the rotor core, and a center hole disposed at a center of the rotor core in the radial direction. A distance from the opening to the magnet insertion hole is shorter than a distance from the opening to the center hole.

According to the present invention, the opening is disposed on a radially inner side of the first magnet holding portion disposed between the permanent magnets adjacent to each other in the magnet insertion hole. By disposing the opening as described above, magnetic resistance through the first magnet holding portion increases, and magnetic flux is less likely to flow through the first magnet holding portion. Therefore, it is possible to suppress demagnetization of the permanent magnet due to the magnetic flux flowing into the permanent magnet from the first magnet holding portion.

DETAILED DESCRIPTION

First Embodiment

First, a first embodiment of the present invention will be described. The first embodiment is intended to suppress demagnetization of permanent magnets in a permanent magnet embedded type motor.

Figure 1:
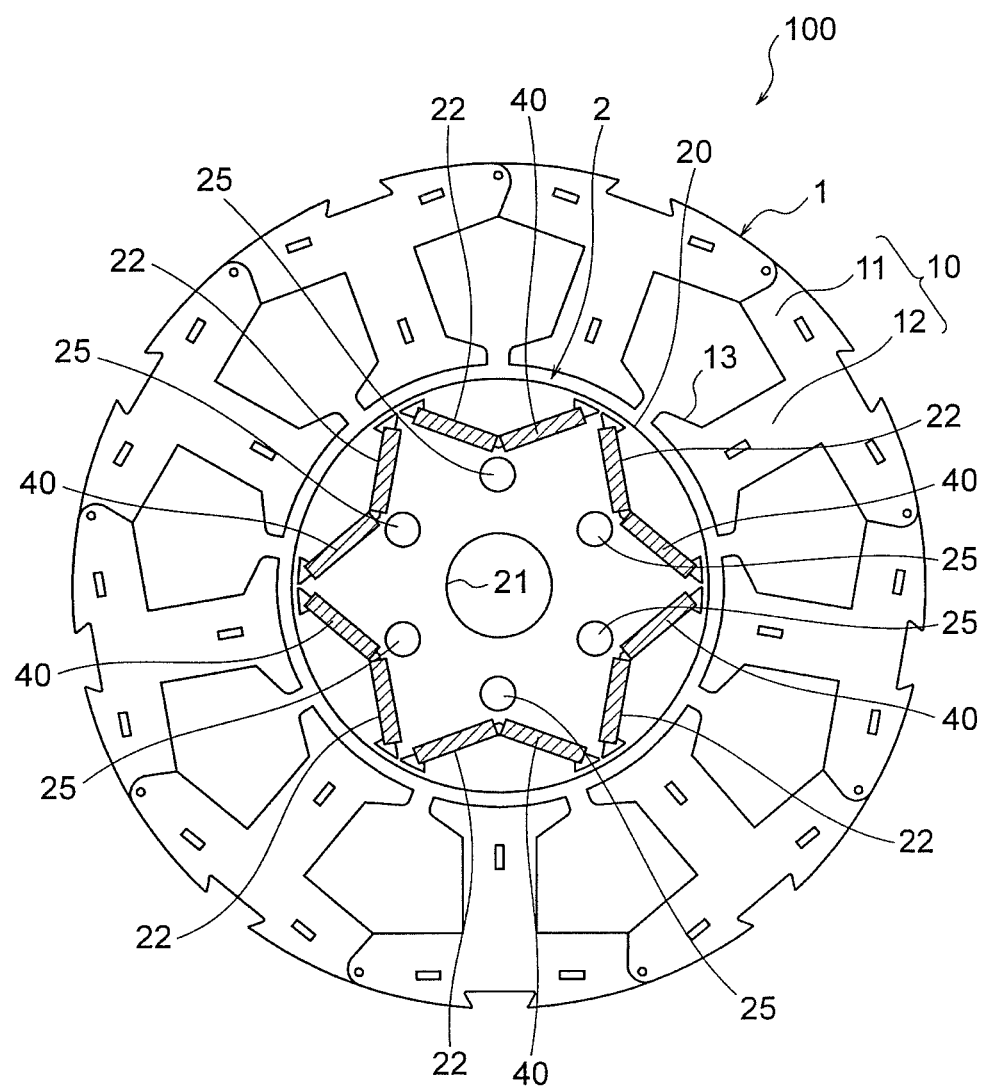
FIG. 1 is a sectional view of a motor of a first embodiment.

FIG. 1 is a sectional view illustrating a configuration of a motor 100 of the first embodiment of the present invention. This motor 100 is a permanent magnet embedded type motor having permanent magnets 40 embedded in a rotor 2, and is used in, for example, a rotary compressor 300 (see FIG. 9). Incidentally, FIG. 1 is a sectional view in a plane perpendicular to a rotation axis of the rotor 2.

As illustrated in FIG. 1, the motor 100 includes a stator 1 and a rotor 2 provided rotatably inside the stator 1. An air gap of, for example, 0.3 to 1 mm is formed between the stator 1 and the rotor 2.

The stator 1 includes a stator core 10 and a coil 15 (FIG. 9) wound around the stator core 10. The stator core 10 is obtained by stacking a plurality of electromagnetic steel sheets each having a thickness of 0.1 to 0.7 mm (here, 0.35 mm) in a direction of the rotation axis and fixing the electromagnetic steel sheets by caulking.

The stator core 10 includes an annular yoke section 11 and a plurality of (here, nine) teeth 12 protruding radially inward from the yoke section 11. Slots are formed between the adjacent teeth 12. Each of the teeth 12 has a tooth tip portion 13 at a radially inner end, and the tooth tip portion 13 has a wide width (a size in a circumferential direction of the stator core 10).

Figure 9:
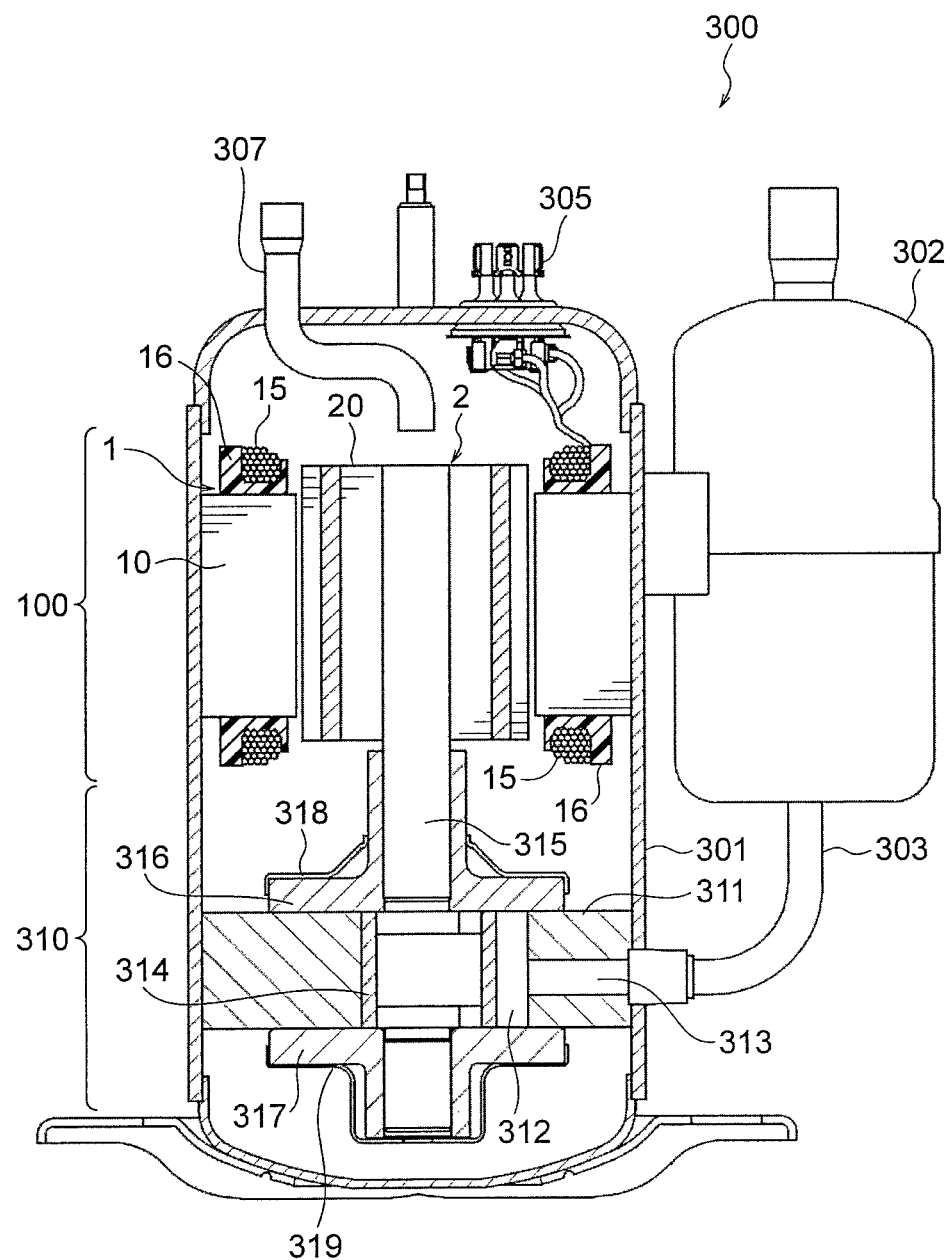
FIG. 9 is a sectional view of a rotary compressor of the first embodiment.

The coil 15 (FIG. 9) as a stator winding is wound around each of the teeth 12. The coil 15 is formed by winding magnet wires around the teeth 12 via an insulator 16 (FIG. 9). Moreover, the coil 15 has three-phase windings (U phase, V phase, and W phase) connected in star connection.

The stator core 10 has a configuration in which a plurality of (here, nine) blocks, one for each tooth 12, are connected with each other via thin wall parts. For example, in a state where the stator core 10 is linearly expanded, the magnet wire (the coil 15) having a diameter of 1.0 mm is wound 80 turns on each tooth 12 of the stator core 10, and thereafter the stator core 10 is bent into an annular shape and both ends thereof are welded together. Incidentally, the stator core 10 is not limited to a configuration in which a plurality of blocks are connected as described above.

Next, a configuration of the rotor 2 will be described. The rotor 2 includes a rotor core 20 and permanent magnets 40 mounted on the rotor core 20. The rotor core 20 is obtained by stacking a plurality of electromagnetic steel sheets each having a thickness of 0.1 to 0.7 mm (here, 0.35 mm) in a direction of the rotation axis and fixing the electromagnetic steel sheets by caulking.

Figure 2:
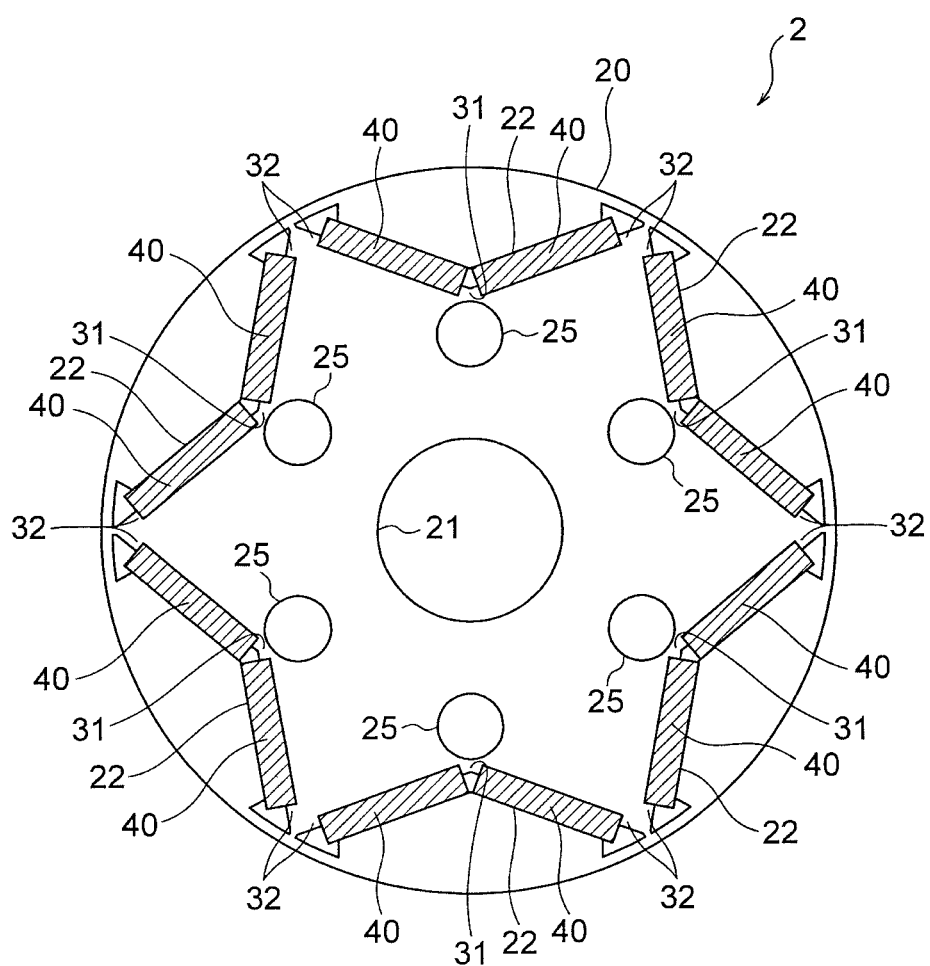
FIG. 2 is a sectional view of a rotor of the first embodiment.

FIG. 2 is a sectional view of the rotor 2. The rotor core 20 has a cylindrical shape, and a shaft hole (a center hole) 21 is formed at a center in a radial direction. A shaft (for example, a shaft 315 of the rotary compressor 300 illustrated in FIG. 9) as a rotation shaft of the rotor 2 is fixed in the shaft hole 21 by shrink fitting, press fitting, or the like.

Hereinafter, a direction along an outer circumference (a circumference of a circle) of the rotor core 20 is simply referred to as a "circumferential direction". Moreover, an axial direction (the direction of the rotation axis) of the rotor core 20 is simply referred to as an "axial direction". Moreover, the radial direction of the rotor core 20 is simply referred to as a "radial direction".

A plurality of (here, six) magnet insertion holes 22 in which the permanent magnets 40 are inserted are formed along an outer circumferential surface of the rotor core 20. The magnet insertion holes 22 are openings, and each magnet insertion hole 22 corresponds to one magnetic pole. Here, six magnet insertion holes 22 are provided, and thus the rotor 2 has six poles in total. Incidentally, the number of poles is not limited to six, but need only be two or more. Moreover, a portion between the magnet insertion holes 22 adjacent to each other is an interpolar portion.

Two permanent magnets 40 are disposed in each magnet insertion hole 22. That is, two permanent magnets 40 are disposed corresponding to each magnetic pole. Here, the rotor 2 has six poles as described above, and thus has twelve permanent magnets 40 in total.

The permanent magnet 40 is a flat plate member elongated in the axial direction of the rotor core 20, has a width in the circumferential direction of the rotor core 20, and has a thickness in the radial direction. The thickness of the permanent magnet 40 is, for example, 2 mm. The permanent magnet 40 is formed of, for example, a rare earth magnet containing neodymium (Nd), iron (Fe), and boron (B) as principal components, but this will be described later.

The permanent magnet 40 is magnetized in a thickness direction. Moreover, two permanent magnets 40 disposed in the magnet insertion hole 22 are magnetized so that the same magnetic poles are directed toward the same side in the radial direction. For example, two permanent magnets 40 disposed in a certain magnet insertion hole 22 are magnetized so that their radially inner sides form N poles and their radially outer sides form S poles.

Figure 3:
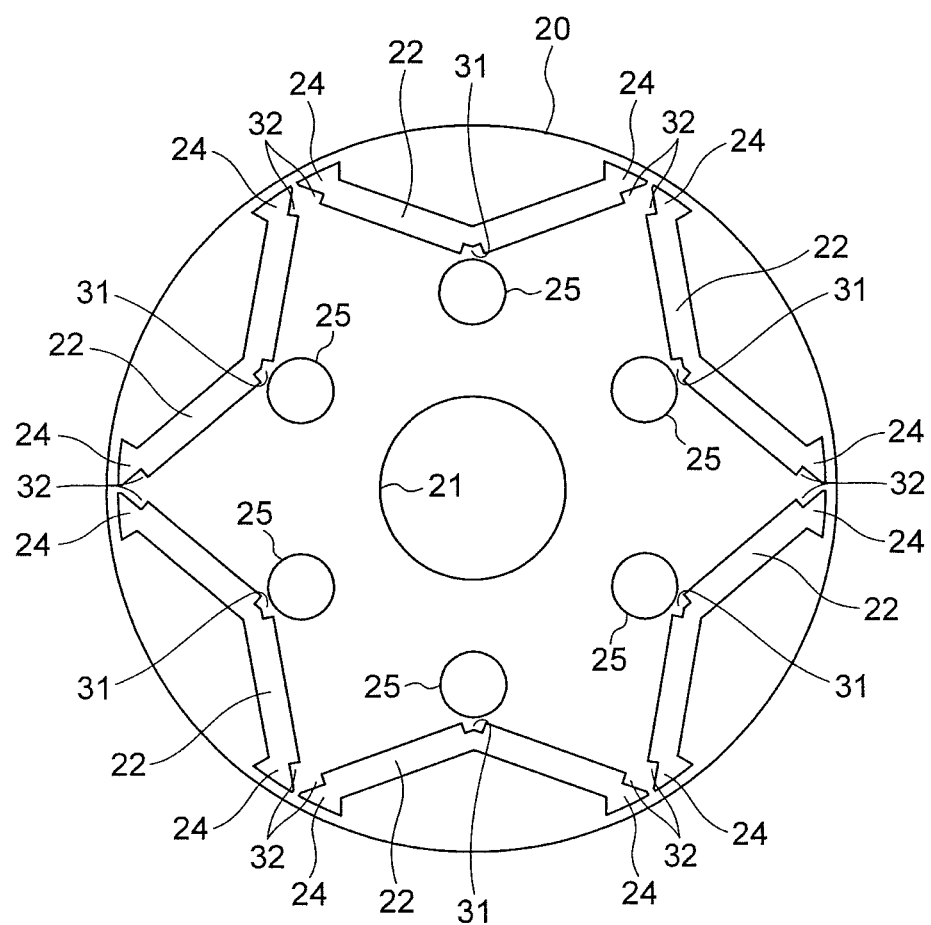
FIG. 3 is a sectional view of a rotor core of the first embodiment.

Next, a configuration of the rotor core 20 will be described. FIG. 3 is a sectional view of the rotor core 20. The magnet insertion holes 22 are evenly arranged in the circumferential direction of the rotor core 20. Moreover, each magnet insertion hole 22 has a V-shape such that a center portion in the circumferential direction protrudes inward in the radial direction of the rotor core 20. The magnet insertion hole 22 includes straight extending sections on both sides of the center portion (a part forming an apex of the V-shape) in the circumferential direction, and the permanent magnet 40 (FIG. 2) is disposed in each of the straight extending sections.

That is, two permanent magnets 40 are arranged in a V-shape at the magnetic pole of the rotor 2. With this arrangement, electrical resistances of the permanent magnets increase, and in-plane eddy current loss can be reduced, as compared with a case in which one permanent magnet 40 is disposed corresponding to each magnetic pole. As a result, loss during driving of the motor 100 can be reduced, and efficiency of the motor 100 can be enhanced.

Flux barriers 24 are formed on both sides of the magnet insertion hole 22 in the circumferential direction. The flux barriers 24 are openings formed continuously with the magnet insertion hole 22. The flux barriers 24 are provided for suppressing leakage magnetic flux between the magnetic poles adjacent to each other (i.e., the magnetic flux flowing through the interpolar portion).

A region between the outer circumference of the rotor core 20 and the flux barrier 24 is formed to have a narrow magnetic path, in order to prevent magnetic flux from short circuiting between the permanent magnets 40 of the magnetic poles adjacent to each other. Here, a distance between the outer circumference of the rotor core 20 and the flux barrier 24 is set to be the same as the thickness (for example, 0.35 mm) of the electromagnetic steel sheet as a part of the rotor core 20.

The rotor core 20 has a first magnet holding portion 31 as a protrusion at a center portion (a circumferential center portion) of the magnet insertion hole 22 in the circumferential direction. The first magnet holding portion 31 is disposed between two permanent magnets 40 (FIG. 2) adjacent to each other in the magnet insertion hole 22.

The first magnet holding portion 31 is formed to protrude inward of the permanent magnet 40 in the thickness direction of the permanent magnet 40 with respect to a plate surface (a flat surface) of the permanent magnet 40. In other words, the first magnet holding portion 31 is formed to be contactable with mutually facing end surfaces of two permanent magnets 40.

Moreover, the rotor core 20 has second magnet holding portions 32 as protrusions at both end portions (circumferential end portions) of the magnet insertion hole 22 in the circumferential direction. In the circumferential direction, the second magnet holding portions 32 are disposed on outer sides of two mutually adjacent permanent magnets 40 (FIG. 2) in the magnet insertion holes 22.

The second magnet holding portion 32 is formed to protrude inward of the permanent magnet 40 in the thickness direction of the permanent magnet 40 with respect to the plate surface (the flat surface). In other words, the second magnet holding portions 32 are formed to be contactable with mutually remote end surfaces of two permanent magnets 40.

A width (a size in the thickness direction of the permanent magnet 40) of the magnet insertion hole 22 is set so that the permanent magnets 40 can be held in the magnet insertion hole 22 without backlash. Moreover, when the thickness of the permanent magnet 40 is 2 mm, the protruding amount of each of the magnet holding portions 31 and 32 in the thickness direction of the permanent magnet 40 is set to, for example, 0.5 mm.

The magnet holding portions 31 and 32 are formed as parts of the rotor core 20, and position (regulate positions of) the permanent magnets 40 so as to prevent the permanent magnets 40 from moving in the magnet insertion hole 22 in the circumferential direction. When the motor 100 is driven, the magnetic flux generated by the coil 15 of the stator 1 and the permanent magnets 40 interact with each other, and an electromagnetic force is generated in a direction to move the permanent magnets 40 in the magnet insertion holes 22. By disposing the magnet holding portions 31 and 32, movement of the permanent magnets 40 can be suppressed, and generation of vibrating sound associated with the movement of the permanent magnets 40 can be suppressed.

Another configuration for positioning the permanent magnets 40 in the magnet insertion holes 22 is one in which a bridge portion is disposed at the center portion of the magnet insertion hole 22 in the circumferential direction to divide the magnet insertion hole 22 into two parts. However, the bridge portion is formed of magnetic material, and thus short circuiting of magnetic flux occurs. That is, for example, the magnetic flux from the N pole of the permanent magnet 40 passes through the bridge portion and flows into the S pole of the same permanent magnet 40. Such short circuiting of the magnetic flux causes a decrease in magnet torque.

In contrast, by employing a configuration having the protrusion-shaped magnet holding portions 31 and 32 in the magnet insertion hole 22 in which a plurality of permanent magnets 40 are disposed, the short circuiting of the magnetic flux which may occur when the bridge portion is provided can be suppressed, and the decrease in magnet torque can be suppressed.

Here, mutually facing sides of two permanent magnets 40 are positioned by one first magnet holding portion 31 disposed at the center portion of the magnet insertion hole in the circumferential direction. However, two first magnet holding portions 31 may be disposed at the center portion of the magnet insertion hole 22 in the circumferential direction so that each of two first magnet holding portions 31 positions corresponding one of the permanent magnets 40.

The magnet holding portions 31 and 32 are formed on a radially inner side of the magnet insertion hole 22. That is, clearances are formed on radially outer sides of the magnet holding portions 31 and 32. The reason why the magnet holding portions 31 and 32 are not formed on the radially outer side of the magnet insertion hole 22 but are formed on the radially inner side of the magnet insertion hole 22 is for the purpose of enhancing an effect of suppressing the demagnetization of the permanent magnets 40.

Here, the demagnetization of the permanent magnets 40 will be described. When the motor 100 is driven, the magnetic flux generated by the coil 15 of the stator 1 passes through the rotor core 20 on an outer circumferential side of the permanent magnets 40. Thus, a magnetic attractive force is generated, and a rotation torque for rotating the rotor 2 is generated.

When a large current flows through the coil 15 of the stator 1, or when a current phase is changed, the magnetic flux generated by the coil 15 may act on the permanent magnet 40 in a direction to cancel magnetization of the permanent magnet 40. Then, when a value of the current flowing through the coil 15 exceeds a threshold value, a phenomenon called demagnetization occurs in which the magnetization of the permanent magnet 40 reverses its direction and does not return to an original state.

When the magnet holding portions 31 and 32 are disposed on the radially outer side of the magnet insertion hole 22, magnetic paths are easily formed by the magnet holding portions 31 and 32 integrally with a region of the rotor core 20 on the radially outer side of the magnet insertion hole 22, because the magnet holding portions 31 and 32 are formed of magnetic material. This region allows the magnetic flux generated by the coil 15 to easily flow therethrough, and thus the end portions of the permanent magnets 40 adjacent to the magnet holding portions 31 and 32 are easily demagnetized.

Therefore, the magnet holding portions 31 and 32 are not disposed on the radially outer side of the magnet insertion hole 22, but are disposed on the radially inner side of the magnet insertion hole 22. With this arrangement, clearances (i.e., clearances inside the magnet insertion hole 22) are formed between the region of the rotor core 20 on the radially outer side of the magnet insertion hole 22 and the magnet holding portions 31 and 32. Therefore, the magnetic flux generated by the coil 15 is less likely to flow in the magnet holding portions 31 and 32, and the demagnetization of the permanent magnets 40 is less likely to occur.

An inside of the magnet insertion hole 22 is an air gap, and magnetic resistance therein is very large. In the magnet insertion hole 22, the magnetic resistance is locally small at parts where the magnet holding portions 31 and 32 are disposed. Therefore, as the current flowing through the coil 15 becomes larger, the magnetic flux generated by the coil 15 may flow into the magnet holding portions 31 and 32, and thus the end portions of the permanent magnets 40 adjacent to the magnet holding portions 31 and 32 may be demagnetized.

Moreover, leakage magnetic flux may be generated between the permanent magnets 40 adjacent to each other in the magnet insertion hole 22, and therefore the end portions of the permanent magnets 40 adjacent to the first magnet holding portion 31 particularly tend to be demagnetized.

Thus, in this first embodiment, an opening 25 is provided on a radially inner side of the first magnet holding portion 31 disposed at the center portion of the magnet insertion hole 22 in the circumferential direction. The opening 25 is, for example, a circular hole and is provided to penetrate the rotor core 20 in the direction of the rotation axis. Incidentally, the opening 25 is not limited to a circular shape.

With the opening 25, a magnetic material part (a part forming the magnetic path) surrounding the first magnet holding portion 31 is reduced, and the magnetic resistance through the first magnet holding portion 31 increases. Therefore, the magnetic flux is less likely to flow through the first magnet holding portion 31. Moreover, with an increase in magnetic resistance through the first magnet holding portion 31, the leakage magnetic flux between the permanent magnets 40 adjacent to each other in the magnet insertion hole 22 is suppressed. As a result, the demagnetization of the permanent magnets 40 due to the magnetic flux flowing into the permanent magnets 40 from the first magnet holding portion 31 is suppressed.

Figure 4:
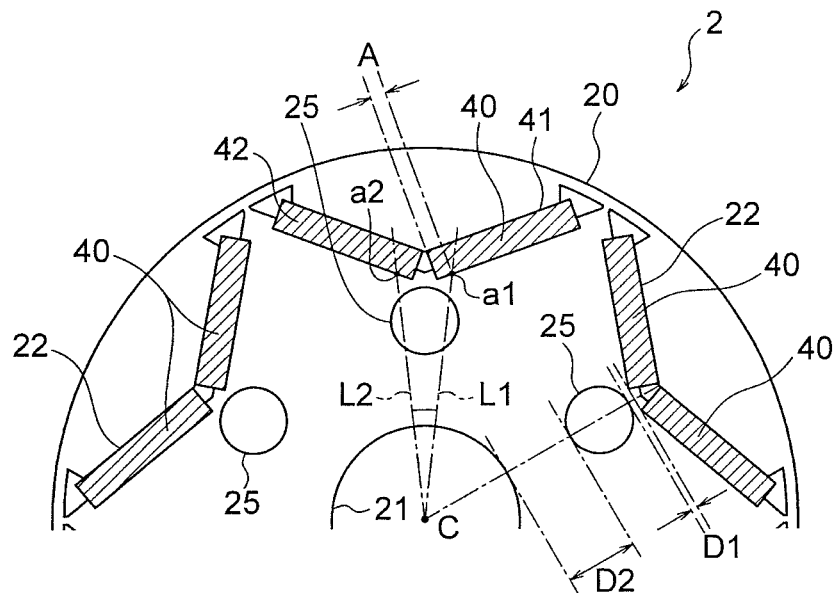
FIG. 4 is a diagram for illustrating locations of openings in the rotor of the first embodiment.

FIG. 4 is a diagram for illustrating locations of the openings 25 in the rotor core 20. It is desirable that the openings 25 are as close to the magnet insertion holes 22 as possible. This is because, as the opening 25 is closer to the magnet insertion hole 22, the magnetic material part (the part forming the magnetic path) surrounding the first magnet holding portion 31 can be reduced, and the magnetic resistance can be made higher. Here, a distance D1 from the opening 25 to the magnet insertion hole 22 is shorter than a distance D2 from the opening 25 to the shaft hole 21.

A minimum value of the distance D1 from the opening 25 to the magnet insertion hole 22 is determined to be a distance at which the opening 25 can be formed by a punching process of the electromagnetic steel sheet and reduction in strength during driving of the motor 100 is prevented. Here, the minimum value of the distance D1 from the opening 25 to the magnet insertion hole 22 is the same as the thickness of one electromagnetic steel sheet as a part of the rotor core 20, and is, for example, 0.35 mm. Moreover, if the distance D1 from the opening 25 to the magnet insertion hole 22 exceeds 3 mm, an effect of reducing the demagnetization of the permanent magnets 40 decreases. Thus, it is desirable that the distance D1 from the opening 25 to the magnet insertion hole 22 is less than or equal to 3 mm.

Moreover, the most easily demagnetizable part of the permanent magnet 40 is a region A covering 5% of the width of the permanent magnet 40 from the end portion on the first magnet holding portion 31 side. Therefore, when the opening 25 is provided so as to face a radially inner side of the region A of the permanent magnet 40, the demagnetization of the most easily demagnetizable part can be effectively suppressed.

This point will be described further. In FIG. 4, a point a1 is defined as a point that is shifted in a width direction of the permanent magnet 40 by 5% of the width of the permanent magnet 40 from the end portion on the first magnet holding portion 31 side of one (for example, the permanent magnet indicated by a reference sign 41 in FIG. 4) of two permanent magnets 40 adjacent to each other in the magnet insertion hole 22. Moreover, a straight line L1 is a defined as a straight line connecting the point a1 and a center C of the rotor core 20. The opening 25 is provided so as to cross the straight line L1.

Moreover, in FIG. 4, a point a2 is defined as a point that is shifted in the width direction of the permanent magnet 40 by 5% of the width of the permanent magnet 40 from the end portion on the first magnet holding portion 31 side of the other (for example, the permanent magnet indicated by a reference sign 42 in FIG. 4) of two permanent magnets 40 adjacent to each other in the magnet insertion hole 22. Moreover, a straight line L2 is defined as a straight line connecting the point a2 and the center C of the rotor core 20. The opening 25 is provided so as to cross the straight line L2.

As described above, the opening 25 is provided so as to cross the straight lines L1 and L2, and thus faces the radially inner side of the most easily demagnetizable regions A of the permanent magnets 40. Thus, the flow of the magnetic flux toward the regions A of the permanent magnets 40 can be suppressed.

Moreover, the openings 25 penetrate the rotor core 20 in the axial direction, and thus have a function to allow refrigerant of, for example, the rotary compressor 300 (FIG. 9) to pass therethrough in the direction of the rotation axis and cool the rotor core 20 and the permanent magnets 40.

When the permanent magnets 40 are formed of rare earth magnets (described later), the coercivities of the permanent magnets 40 decrease with a rise in temperature. Thus, the demagnetization of the permanent magnets 40 can be suppressed by cooling the rotor core 20 and the permanent magnets 40 by the refrigerant passing through the openings 25.

Next, description will be made of a measurement result of changes of demagnetizing factors of the motor of the first embodiment and a motor of a comparative example in relation to a current. The motor of the first embodiment is as described with reference to FIGS. 1 to 4.

Figure 5:
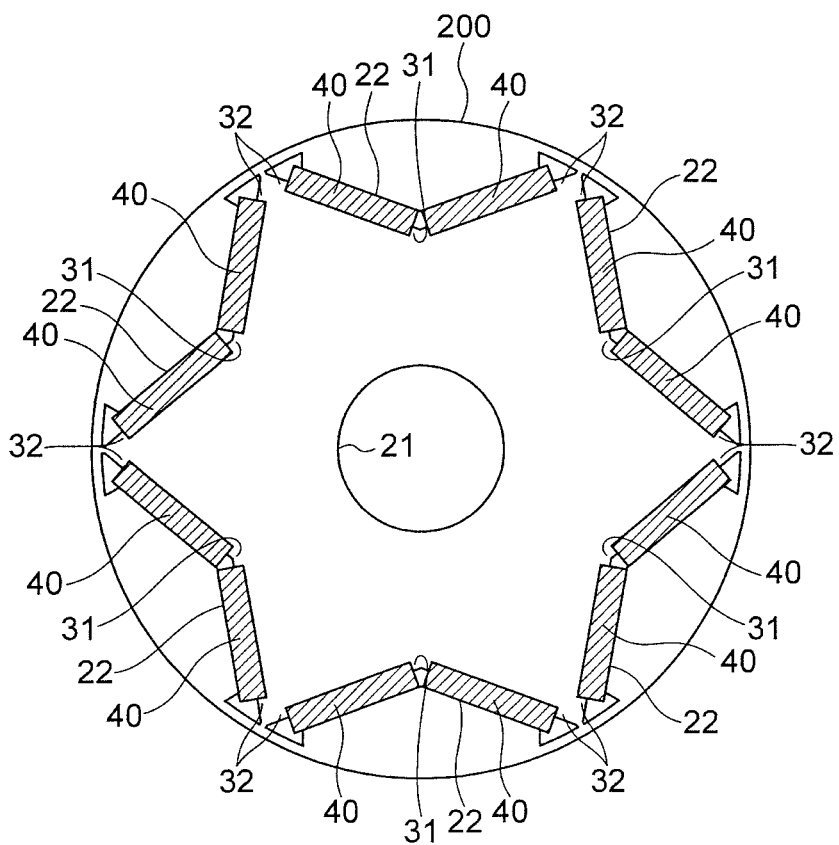
FIG. 5 is a sectional view of a rotor of a comparative example.
Figure 6:
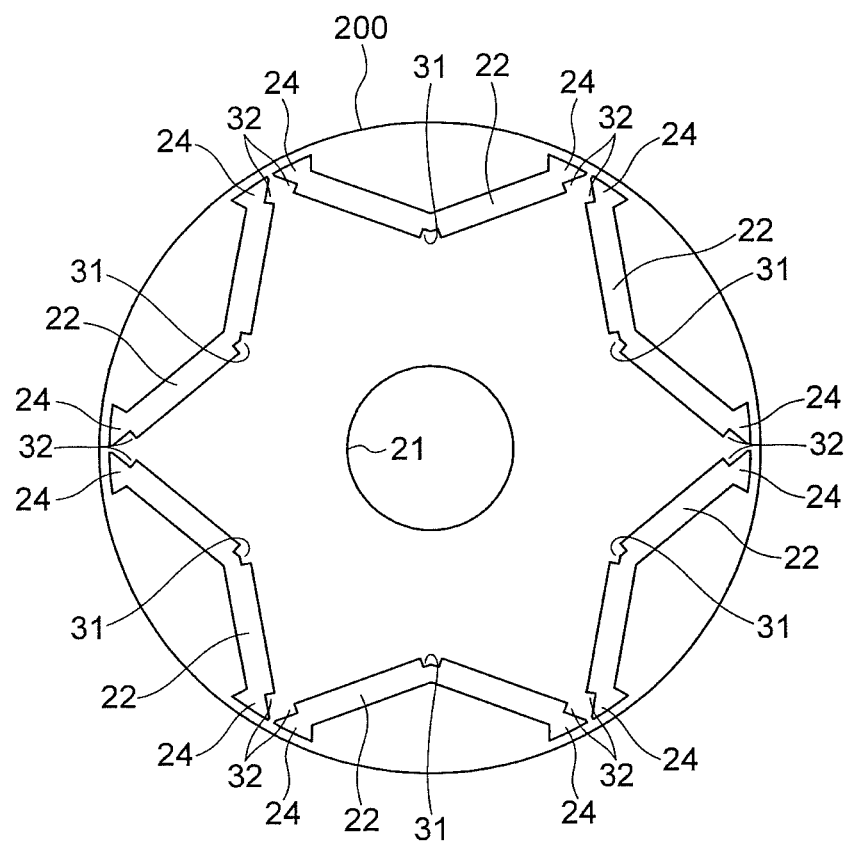
FIG. 6 is a sectional view of a rotor core of the comparative example.

FIG. 5 is a sectional view of a rotor of the motor of the comparative example. FIG. 6 is a sectional view of a rotor core of the motor of the comparative example. As illustrated in FIGS. 5 and 6, the rotor core 200 of the motor of the comparative example includes V-shaped magnet insertion holes 22 whose center portions in the circumferential direction protrude radially inward, and two permanent magnets 40 are disposed in each magnet insertion hole 22, as is the case with the first embodiment. The first magnet holding portion 31 is disposed at the center portion of the magnet insertion hole 22 in the circumferential direction, and the second magnet holding portions 32 are disposed at the end portions of the magnet insertion hole 22 in the circumferential direction. However, the above described openings 25 (FIGS. 1 to 4) are not provided.

Figure 7:
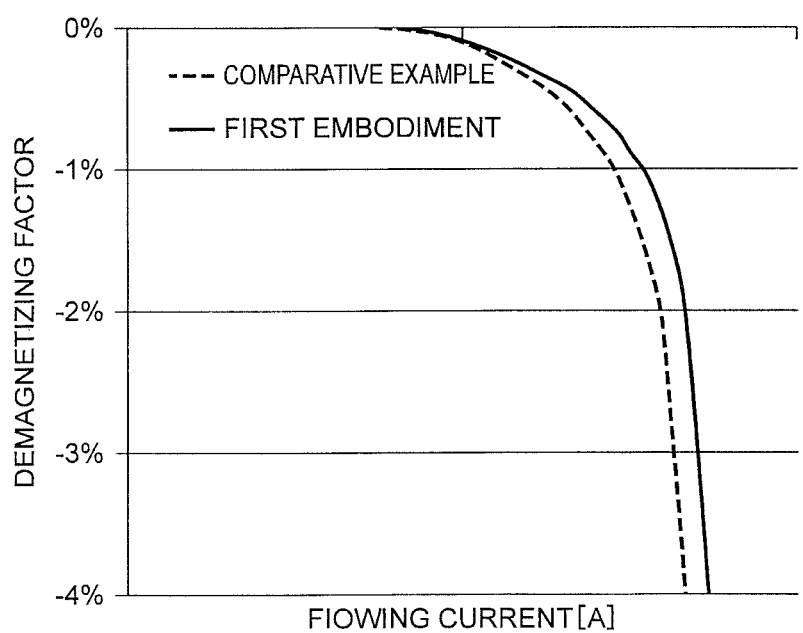
FIG. 7 is a graph illustrating changes in demagnetizing factors of the motor of the first embodiment and a motor of the comparative example.

FIG. 7 is a graph illustrating changes of demagnetizing factors of the motor of the first embodiment and the motor of the comparative example. The horizontal axis represents a current (A) flowing through the coil 15 of the stator 1 (FIG. 1), and the vertical axis represents a demagnetizing factor (%). Here, the demagnetizing factor of the permanent magnet 40 is measured while the current flowing through the coil 15 of the stator 1 is changed from 0 A to 15 A.

In a general permanent magnet embedded type motor, an acceptance criterion of the demagnetizing factor of the permanent magnet is −3%. From the graph of FIG. 7, in the motor of the first embodiment, a current (3% demagnetization current) at which the demagnetizing factor reaches −3% increases by approximately 5% as compared with the motor of the comparative example. That is, the motor of the first embodiment has a usable current range wider than the motor of the comparative example.

Moreover, assuming that the motor of the first embodiment is driven by the same current as the motor of the comparative example, permanent magnets having a lower coercivity can be used. That is, addition of dysprosium or the like for enhancing the coercivity of the permanent magnet can be reduced in amount or eliminated. Therefore, production cost can be reduced, and the decrease in residual magnetic flux density due to the addition of dysprosium can be avoided (i.e., the efficiency of the motor can be enhanced).

Figure 8:
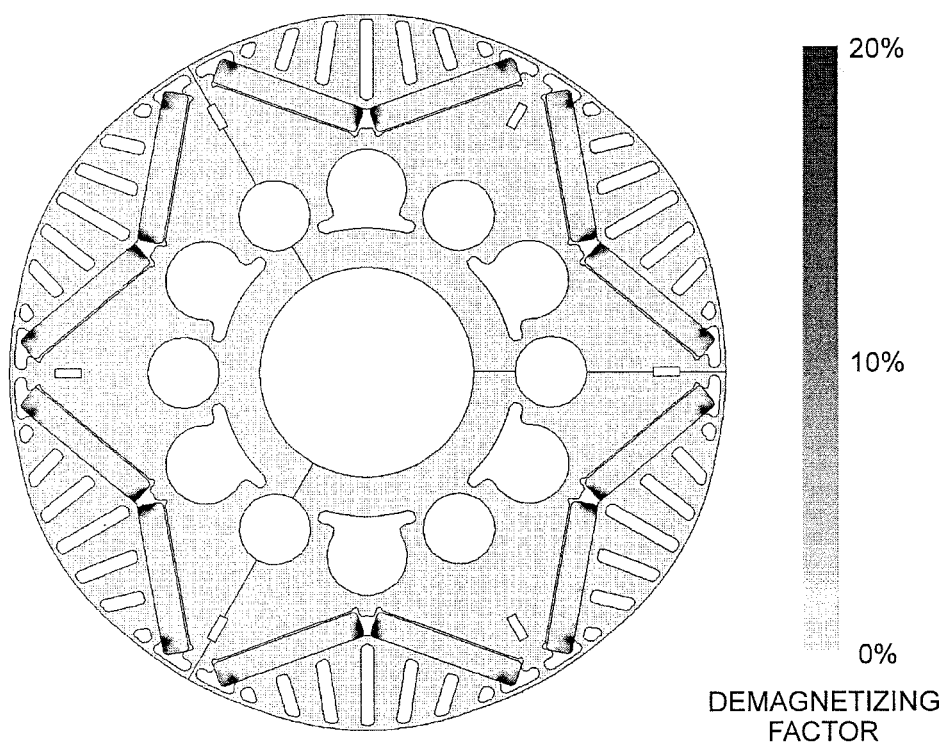
FIG. 8 is a diagram illustrating an analysis result of the demagnetizing factor of a permanent magnet in the motor of the first embodiment.

FIG. 8 is a diagram illustrating an analysis result of the demagnetizing factor of the permanent magnet 40 of the motor of the first embodiment when the 3% demagnetization current flows through the coil 15 of the stator 1. From FIG. 8, it is understood that the region (the region A illustrated in FIG. 4) covering 5% of the width of the permanent magnet in the width direction from the end portion of the permanent magnet 40 on the first magnet holding portion 31 side (the center side of the magnet insertion hole 22 in the circumferential direction) is easily demagnetized.

Therefore, as described with reference to FIG. 4, the demagnetization of the permanent magnet 40 can be effectively suppressed by providing the opening 25 so as to face the radially inner side of the most easily demagnetizable region A (i.e., the region covering 5% of the width of the permanent magnet from the end portion of the permanent magnet 40 in the width direction on the first magnet holding portion 31 side) of the permanent magnet 40.

Next, a configuration of the permanent magnet 40 will be described. The permanent magnet 40 is formed of a rare earth magnet containing neodymium (Nd), iron (Fe), and boron (B) as principal components, and contains no dysprosium (Dy). The permanent magnet 40 has a residual magnetic flux density of 1.27 to 1.42 T at 20° C. is, and a coercivity of 1671 to 1922 kA/m at 20° C.

The rare earth magnet containing neodymium, iron, and boron as principal components has a property that the coercivity decreases with a rise in temperature, and a decreasing rate of the coercivity is −0.5 to −0.6%/K. When the motor 100 is used in a compressor, the motor 100 is used in a high temperature atmosphere of 100 to 150° C. In this case, the motor 100 is used at a temperature higher than a normal temperature (20° C.) by approximately 130° C., and thus the coercivity decreases by 65% at 150° C. when the decreasing rate of the coercivity of the permanent magnet 40 is −0.5%/K. For this reason, in general, dysprosium is added to the permanent magnet to enhance the coercivity. The coercivity increases in proportion to dysprosium content.

In order to prevent the demagnetization of the permanent magnets under a maximum load expected in the compressor, the coercivity of approximately 1100 to 1500 A/m is needed. In order to obtain this coercivity at an ambient temperature of 150° C., the coercivity at the normal temperature (20° C.) needs to be 1800 to 2300 A/m.

The rare earth magnet containing neodymium, iron, and boron as principal components exhibits the coercivity of approximately 1800 A/m at the normal temperature when dysprosium is not added thereto. Therefore, 2 wt % of dysprosium needs to be added in order to obtain the coercivity of 2300 A/m. It is known that a price of dysprosium is unstable, and procurement risk exits.

Moreover, when dysprosium is added to the permanent magnet, the residual magnetic flux density decreases. As the residual magnetic flux density decreases, the magnet torque of the motor decreases, and the current needed to obtain a desired output increases. That is, a copper loss increases, and the efficiency of the motor decreases. For these reasons, reduction of an additive amount of dysprosium is required.

Thus, the permanent magnet 40 used in this first embodiment is formed of a rare earth magnet containing neodymium, iron, and boron as principal components, and contains no dysprosium. The rare earth magnet (containing neodymium, iron, and boron as principal components) containing no dysprosium as described above has a residual magnetic flux density of 1.27 to 1.42 T at 20° C. and a coercivity of 1671 to 1922 kA/m at 20° C.

In this first embodiment, the rotor core 20 has the openings 25 disposed on the radially inner side of the first magnet holding portions 31, and the demagnetization of the permanent magnets 40 is suppressed. Therefore, even when the permanent magnets 40 contain no dysprosium (have the residual magnetic flux density of 1.27 to 1.42 T at 20° C., and the coercivity of 1671 to 1922 kA/m at 20° C.), the demagnetization of the permanent magnets 40 can be suppressed. In addition, the decrease in residual magnetic flux density due to the addition of dysprosium can be avoided, and thus the current value needed to obtain the same torque can be reduced. As a result, the copper loss can be reduced, and the efficiency of the motor can be enhanced.

Next, the rotary compressor 300 using the motor 100 will be described. FIG. 9 is a sectional view illustrating a configuration of the rotary compressor 300. The rotary compressor 300 includes a frame 301, a compression mechanism 310 provided in the frame 301, and the motor 100 for driving the compression mechanism 310.

The compression mechanism 310 includes a cylinder 311 including a cylinder chamber 312, a shaft 315 rotated by the motor 100, a rolling piston 314 fixed to the shaft 315, vanes (not illustrated in the figure) dividing an inside of the cylinder chamber 312 into a suction side and a compression side, and an upper frame 316 and a lower frame 317 through which the shaft 315 is inserted and which close end surfaces of the cylinder chamber 312 in the axial direction. An upper discharge muffler 318 is mounted on the upper frame 316, and a lower discharge muffler 319 is mounted on the lower frame 317.

The frame 301 is a cylindrical container formed by drawing a steel plate having a thickness of, for example, 3 mm. Refrigerating machine oil (not illustrated in the figure) for lubricating each sliding portion of the compression mechanism 310 is stored in a bottom portion of the frame 301. The shaft 315 is held rotatably by the upper frame 316 and the lower frame 317.

The cylinder 311 has the cylinder chamber 312 therein. The rolling piston 314 eccentrically rotates in the cylinder chamber 312. The shaft 315 has an eccentric shaft part, and the rolling piston 314 engages the eccentric shaft part.

The stator core 10 of the motor 100 is mounted on an inner side of the frame 301 by shrink fitting. Electric power is supplied to the coil 15 wound around the stator core 10 from a glass terminal 305 fixed to the frame 301. The shaft 315 is fixed in the shaft hole 21 (FIG. 1) of the rotor 2.

An accumulator 302 storing refrigerant gas is mounted outside the frame 301. A suction pipe 303 is fixed to the frame 301, and the refrigerant gas is supplied from the accumulator 302 to the cylinder 311 via this suction pipe 303. Moreover, a discharge pipe 307 for discharging the refrigerant to outside is provided at an upper part of the frame 301.

As the refrigerant, for example, R410A, R407C, R22, or the like can be used. Moreover, it is desirable to use the refrigerant having a low GWP (Global Warming Potential) in terms of global warming prevention. For example, the following refrigerant can be used as the low GWP refrigerant.

(1) First, a halogenated hydrocarbon having a carbon double bond in its composition such as HFO (Hydro-Fluoro-Olefin)-1234yf ($CF_3CF=CH_2$) can be used. A GWP of HFO-1234yf is 4.

(2) Moreover, a hydrocarbon having a carbon double bond in its composition such as R1270 (propylene) may be used. R1270 has a GWP of 3, which is lower than that of HFO-1234yf, but has higher combustibility than HFO-1234yf.

(3) Moreover, a mixture including at least one of a halogenated hydrocarbon having a carbon double bond in its composition or a hydrocarbon having a carbon double bond in its composition such as a mixture of HFO-1234yf and R32 may be used. Since the above described HFO-1234yf is a low pressure refrigerant and tends to cause an increase in pressure loss, its use may lead to a deterioration in performance of the refrigeration cycle (particularly, the evaporator). Therefore, it is practically desirable to use a mixture of HF-1235yf with R32 or R41 which is a higher pressure refrigerant than HFO-1234yf.

An operation of the rotary compressor 300 is as described below. The refrigerant gas supplied from the accumulator 302 is supplied into the cylinder chamber 312 of the cylinder 311 through the suction pipe 303. When the motor 100 is driven and the rotor 2 rotates, the shaft 315 rotates together with the rotor 2. Then, the rolling piston 314 engaging the shaft 315 eccentrically rotates in the cylinder chamber 312, and the refrigerant is compressed in the cylinder chamber 312. The compressed refrigerant passes through the discharge mufflers 318 and 319, then flows upward inside the frame 301 through air holes (not illustrated in the figure) provided in the motor 100, and is discharged from the discharge pipe 307.

Figure 10:
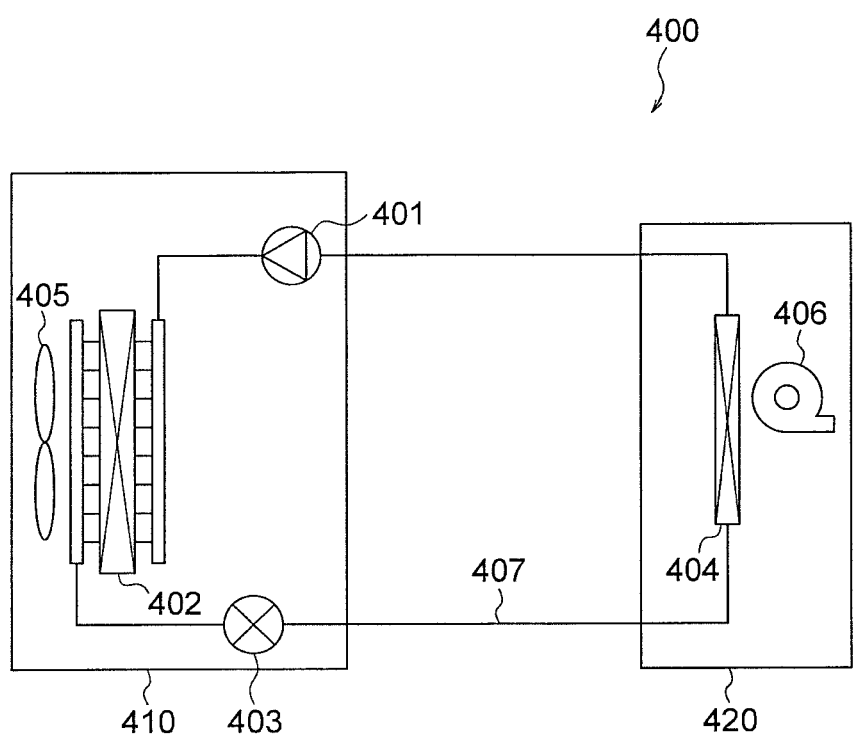
FIG. 10 is a diagram of a refrigeration and air conditioning apparatus of the first embodiment.

Next, a refrigeration and air conditioning apparatus 400 of the first embodiment will be described. FIG. 10 is a diagram illustrating a configuration of the refrigeration and air conditioning apparatus 400 of the first embodiment. The refrigeration and air conditioning apparatus 400 illustrated in FIG. 10 includes a compressor 401, a condenser 402, a restrictor (an expansion valve) 403, and an evaporator 404. The compressor 401, the condenser 402, the restrictor 403, and the evaporator 404 are connected by a refrigerant pipe 407 to configure a refrigeration cycle. That is, the refrigerant circulates in order of the compressor 401, the condenser 402, the restrictor 403, and the evaporator 404.

The compressor 401, the condenser 402, and the restrictor 403 are provided in an outdoor unit 410. The compressor 401 is constituted by the rotary compressor 300 illustrated in FIG. 9. An outdoor blower 405 for supplying outdoor air to the condenser 402 is provided in the outdoor unit 410. The evaporator 404 is provided in an indoor unit 420. An indoor blower 406 for supplying indoor air to the evaporator 404 is provided in the indoor unit 420.

An operation of the refrigeration and air conditioning apparatus 400 is as described below. The compressor 401 compresses suctioned refrigerant, and delivers the refrigerant. The condenser 402 exchanges heat between the refrigerant flowing from the compressor 401 and the outdoor air, condenses and liquefies the refrigerant, and delivers the refrigerant to the refrigerant pipe 407. The outdoor blower 405 supplies the outdoor air to the condenser 402. The restrictor 403 regulates a pressure or the like of the refrigerant flowing through the refrigerant pipe 407 by changing an opening degree.

The evaporator 404 exchanges heat between the refrigerant brought into a low pressure state by the restrictor 403 and the indoor air, allows the refrigerant to draw heat from the air and evaporate (vaporize), and delivers the refrigerant to the refrigerant pipe 407. The indoor blower 406 supplies the indoor air to the evaporator 404. Thus, cool wind whose heat is drawn by the evaporator 404 is supplied into a room.

The compressor 401 of the refrigeration and air conditioning apparatus 400 is used in a high temperature atmosphere, and a large load fluctuation occurs when the compressor 401 performs compression. At high temperature, the coercivity of the permanent magnet 40 tends to decrease, and a fluctuation of the current flowing through the coil 15 increases due to the load fluctuation. The motor 100 of the first embodiment is configured to suppress the demagnetization of the permanent magnets 40 as described above, and thus is suitable for use in the compressor 401 of the refrigeration and air conditioning apparatus 400.

As described above, according to the first embodiment of the present invention, the rotor core 20 has the first magnet holding portion 31 disposed between the permanent magnets 40 adjacent to each other in the magnet insertion hole 22, and the opening 25 on the radially inner side of the first magnet holding portion 31. Moreover, the distance D1 from the opening 25 to the magnet insertion hole 22 is shorter than the distance D2 from the opening 25 to the shaft hole 21. By disposing the opening 25 as described above, the magnetic resistance through the first magnet holding portion 31 increases, and the magnetic flux is less likely to flow through the first magnet holding portion 31. Moreover, the leakage magnetic flux between the permanent magnets 40 adjacent to each other in the magnet insertion hole 22 is suppressed by the increase in magnetic resistance through the first magnet holding portion 31, and thus the demagnetization of the permanent magnets 40 due to the magnetic flux flowing into the permanent magnets 40 from the first magnet holding portions 31 can be suppressed. Moreover, by suppressing the demagnetization of the permanent magnets 40 as described above, a deterioration in performance of the motor 100 is suppressed, and a stable drive control is enabled.

Moreover, the rotor core 20 includes the second magnet holding portions 32 at the end portions of the magnet insertion hole 22 in the circumferential direction, in addition to the first magnet holding portion 31. Therefore, the permanent magnets 40 can be positioned between the first magnet holding portion 31 and the second magnet holding portions 32 so that the permanent magnets 40 do not move, and generation of vibrating sound associated with the movement of the permanent magnets 40 can be suppressed.

Moreover, the distance from the opening 25 to the magnet insertion hole 22 is greater than or equal to the thickness of one electromagnetic steel sheet. Thus, the opening 25 can be formed using a punching process of the electromagnetic steel sheet, and a strength during driving of the motor 100 can be ensured.

Moreover, the distance from the opening 25 to the magnet insertion hole 22 is less than or equal to 3 mm, and thus a sufficient effect of suppressing the demagnetization of the permanent magnets 40 can be obtained.

Moreover, the opening 25 is provided to cross the straight line L1 illustrated in FIG. 4 (a straight line connecting the center C of the rotor core 20 and the point a1 that is shifted in the width direction by 5% of the width of the permanent magnet 40 from the end portion on the first magnet holding portion 31 side of one of the permanent magnets 40 adjacent to each other in the magnet insertion hole 22) and the straight line L2 (a straight line connecting the center C of the rotor core 20 and the point a2 that is shifted in the width direction by 5% of the width of the permanent magnet 40 from the end portion on the first magnet holding portion 31 side of the other of the permanent magnets 40 adjacent to each other in the magnet insertion hole 22). Therefore, the demagnetization of the most easily demagnetizable regions of the permanent magnets 40 can be suppressed.

Moreover, the magnet insertion hole 22 has the V-shape such that the center portion in the circumferential direction protrudes radially inward, and two permanent magnets 40 are disposed in the magnet insertion hole 22. Therefore, two permanent magnets 40 can be arranged in the V-shape in the magnetic pole, and the in-plane eddy current loss in the permanent magnets 40 can be reduced. Thus, the efficiency of the motor can be enhanced, and the energy consumption amount can be reduced.

Moreover, the permanent magnet 40 is a rare earth magnet containing neodymium (Nd), iron (Fe), and boron (B) as principal components, and exhibits a residual magnetic flux density in a range from 1.27 T to 1.42 T at 20° C. and a coercivity in a range from 1671 kA/m to 1922 kA/m at 20° C. Therefore, dysprosium can be made unnecessary, and the decrease in residual magnetic flux density due to the addition of dysprosium can be suppressed. That is, the current value needed to obtain the same torque is reduced, the copper loss is reduced, and thus the efficiency of the motor can be enhanced.

Moreover, the openings 25 have circular shapes, and therefore are easily formed using the punching process of the electromagnetic steel sheet.

Moreover, the openings 25 penetrate the rotor core 20 in the axial direction, and allow the refrigerant of, for example, the rotary compressor 300 to pass therethrough and cool the rotor core 20 and the permanent magnets 40. Therefore, the demagnetization of the permanent magnets due to a decrease in coercivity under high temperature can be suppressed.

Moreover, the magnet holding portions 31 and 32 are formed to protrude inward of the permanent magnet 40 in the thickness direction of the permanent magnet 40 from the plate surface of the permanent magnet 40. Therefore, the permanent magnet 40 can be effectively positioned in the magnet insertion hole 22.

Moreover, the magnet holding portions 31 and 32 are disposed on the inner side of the magnet insertion hole 22 in the radial direction of the rotor core 20. Therefore, the magnetic flux generated by the coil 15 of the stator 1 is less likely to flow through the magnet holding portions 31 and 32, and the demagnetization of the permanent magnets 40 due to the magnetic flux flowing through the magnet holding portions 31 and 32 can be suppressed.

Moreover, the rotary compressor 300 using the motor 100 is used as, for example, the compressor 401 of the refrigeration and air conditioning apparatus 400. In this case, the motor 100 is used in a high temperature atmosphere, and is susceptible to load fluctuation. The motor 100 of the first embodiment is configured to suppress the demagnetization of the permanent magnets 40 as described above, and thus is suitable for use in the compressor 401 of the refrigeration and air conditioning apparatus 400.

Second Embodiment

Next, a second embodiment of the present invention will be described. The second embodiment is intended to suppress the demagnetization of the permanent magnets 40 by further cooling the permanent magnets 40.

Figure 11:
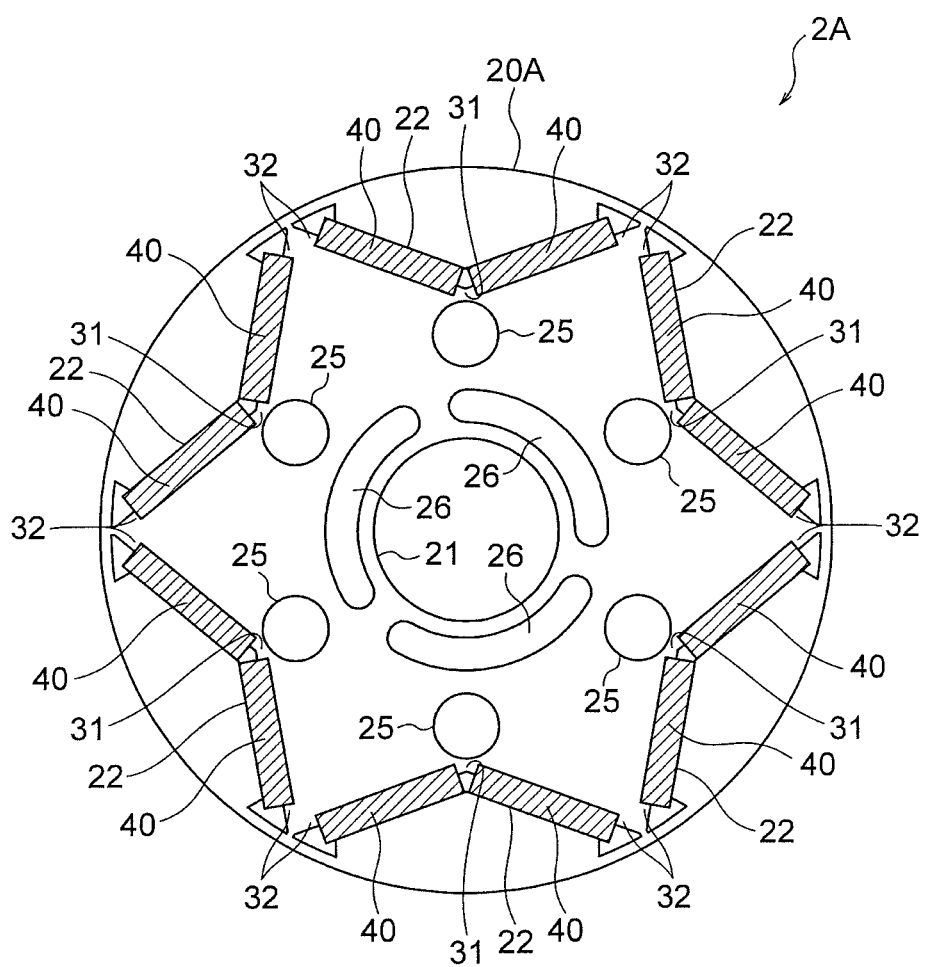
FIG. 11 is a sectional view of a rotor of a second embodiment.
Figure 12:
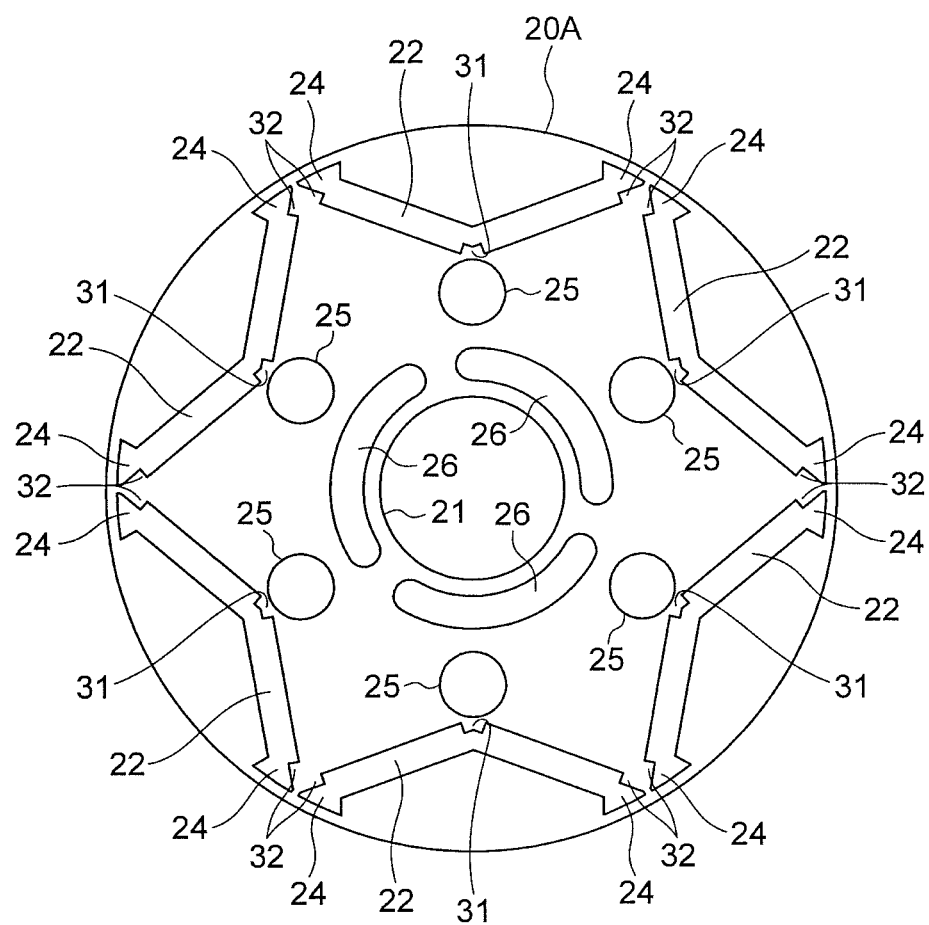
FIG. 12 is a sectional view of a rotor core of the second embodiment.

FIG. 11 is a sectional view of a rotor 2A of the second embodiment. FIG. 12 is a sectional view of a rotor core 20A of the second embodiment.

The rotor 2A of the second embodiment includes a plurality of (here, six) magnet insertion holes 22 arranged in the circumferential direction, and each magnet insertion hole 22 corresponds to a magnetic pole. The magnet holding portions 31 and 32 are provided at the center portion and the end portions of the magnet insertion hole 22 in the circumferential direction. The flux barriers 24 are provided on both sides of the magnet insertion hole 22 in the circumferential direction. Moreover, the opening 25 is provided on the radially inner side of the first magnet holding portion 31. Configurations of the magnet insertion holes 22, the magnet holding portions 31 and 32, the flux barriers 24, and the openings 25 are as described in the first embodiment.

The rotor 2A of this second embodiment includes a hole 26 between the opening 25 and the shaft hole 21. Here, three holes 26 are evenly arranged in the circumferential direction. The hole 26 extends in a circular arc shape from a center of one magnetic pole to an interpolar portion between the next magnetic pole and the further next magnetic pole. That is, one end of the hole 26 in the circumferential direction (an extending direction) is positioned at the center of the magnetic pole, and the other end of the hole 26 in the circumferential direction is positioned at the interpolar portion.

Incidentally, the hole 26 is not limited to the shape illustrated in FIGS. 11 and 12, but need only be disposed between the opening 25 and the shaft hole 21.

The holes 26 have a function to allow the refrigerant of, for example, the rotary compressor 300 (FIG. 9) to pass therethrough in the axial direction and cool the permanent magnets 40. Although the hole 26 is apart from the permanent magnets 40, the hole 26 has a flow passage cross-sectional area larger than the opening 25, and thus it is possible to obtain an effect of cooling the permanent magnets 40 via the rotor core 20A.

When the permanent magnets 40 are formed of rare earth magnets, the coercivities of the permanent magnets 40 decrease with a rise in temperature, and the permanent magnets 40 become easily demagnetized. Thus, when the permanent magnets 40 are cooled by the refrigerant passing through the openings 25 and the holes 26, the demagnetization of the permanent magnets 40 formed of rare earth magnets is effectively suppressed.

Incidentally, the motor of the second embodiment is configured in a similar manner to the motor 100 described in the first embodiment, except for the configuration of the rotor core 20A. Moreover, the motor of the second embodiment can be used in the rotary compressor 300 (FIG. 9) and the refrigeration and air conditioning apparatus 400 (FIG. 10) described in the first embodiment.

As described above, in the second embodiment of the present invention, the rotor core 20A includes the holes 26 between the openings 25 and the shaft hole 21. Therefore, the refrigerant of, for example, the compressor passes through the openings 25 and the holes 26 in the axial direction to cool the permanent magnets 40. As a result, the demagnetization of the permanent magnets 40 (for example, the permanent magnets formed of rare earth magnets) due to the decrease in coercivity under high temperature can be effectively suppressed.

Third Embodiment

Next, a third embodiment of the present invention will be described. The third embodiment is intended to facilitate producing a rotor core 20B by providing holes 27 which are larger in area and smaller in number than the openings 25 described in the first embodiment.

Figure 13:
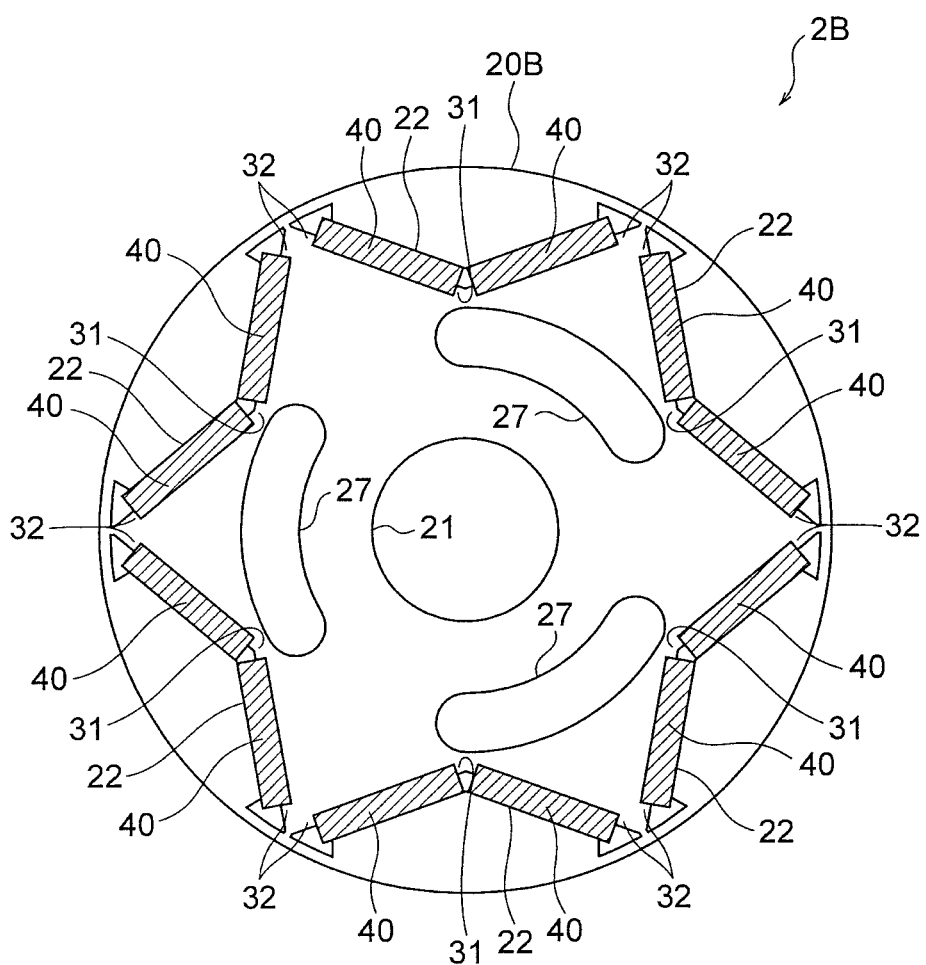
FIG. 13 is a sectional view of a rotor of a third embodiment.
Figure 14:
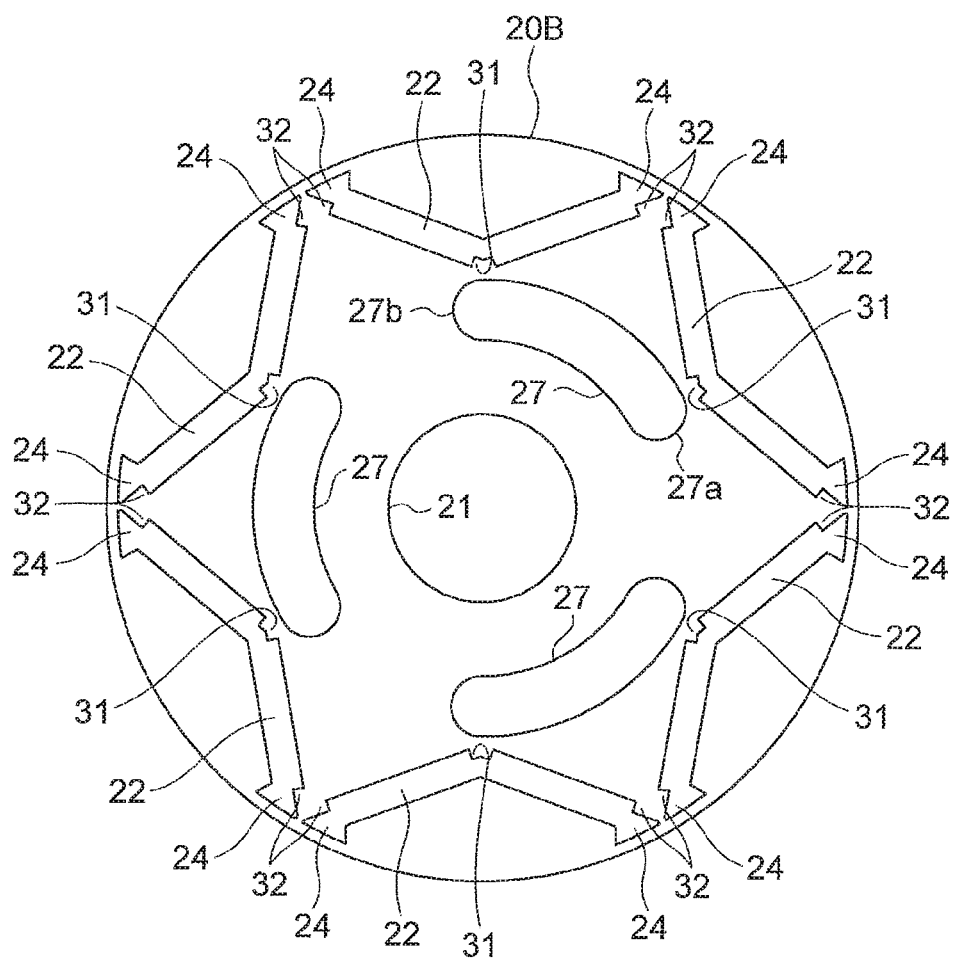
FIG. 14 is a sectional view of a rotor core of the third embodiment.

FIG. 13 is a sectional view of a rotor 2B of the third embodiment. FIG. 14 is a sectional view of the rotor core 20B of the third embodiment.

The rotor 2B of the third embodiment includes a plurality of (here, six) magnet insertion holes 22 arranged in the circumferential direction, and each magnet insertion hole 22 corresponds to one magnetic pole. The magnet holding portions 31 and 32 are disposed at the center portion and the end portions of the magnet insertion hole 22 in the circumferential direction. The flux barriers 24 are provided on both sides of the magnet insertion hole 22 in the circumferential direction. Configurations of the magnet insertion holes 22, the magnet holding portions 31 and 32, and the flux barriers 24 are as described in the first embodiment.

The rotor 2B of the third embodiment includes three holes 27 on the radially inner sides of the six magnet insertion holes 22 instead of the openings 25 described in the first embodiment, and the three holes 27 extend in the circumferential direction. The hole 27 has a circular arc shape circumferentially connecting circular openings 27a and 27b that are positioned on the radially inner sides of the first magnet holding portions 31 of the adjacent two magnet insertion holes 22.

Moreover, of the openings 27a and 27b positioned at both ends of the holes 27, the opening 27a is disposed so as to face the most easily demagnetizable region A (FIG. 4) of the permanent magnet 40 disposed in the magnet insertion hole 22 facing the opening 27a. Similarly, the opening 27b is disposed so as to face the most easily demagnetizable region A (FIG. 4) of the permanent magnet 40 disposed in the magnet insertion hole 22 facing the opening 27b.

Incidentally, the hole 27 is not limited to the shape illustrated in FIGS. 13 and 14, but need only have a shape connecting a plurality of openings corresponding to the mutually adjacent magnet insertion holes 22 in the circumferential direction of the rotor core 20B.

The holes 27 have a function to allow the refrigerant of, for example, the rotary compressor 300 (FIG. 9) to pass therethrough in the axial direction and cool the permanent magnets 40. The holes 27 have flow passage cross-sectional areas larger than the openings 25, and thus exhibit a higher effect of cooling the rotor core 20B.

When the permanent magnets 40 are formed of rare earth magnets, the coercivities of the permanent magnets 40 decrease with a rise in temperature, and the permanent magnets 40 become easily demagnetized. Therefore, when the rotor core 20 is cooled by the refrigerant passing through the holes 27, the demagnetization of the permanent magnets 40 formed of rare earth magnets is effectively suppressed.

Although six openings 25 are necessarily provided for six magnetic poles in the first embodiment, only three holes 27 need be provided and each hole 27 is large in the third embodiment. Thus, the processing of the electromagnetic steel sheets is easy and the production of the rotor core 20B is easy.

Incidentally, the motor of the third embodiment is configured in a similar manner to the motor 100 described in the first embodiment, except for the configuration of the rotor core 20B. Moreover, the motor of the third embodiment can be used in the rotary compressor 300 (FIG. 9) and the refrigeration and air conditioning apparatus 400 (FIG. 10) described in the first embodiment.

As described above, in the third embodiment of the present invention, the hole 27 which is continuous in the circumferential direction of the rotor core 20B is formed by a plurality of openings 27a and 27b corresponding to the mutually adjacent magnet insertion holes 22 of the rotor core 20B. Therefore, the refrigerant of, for example, the compressor is allowed to pass through the hole 27 in the axial direction to cool the permanent magnets 40. As a result, the demagnetization of the permanent magnets 40 (for example, permanent magnets formed of rare earth magnets) whose coercivities decrease at high temperature can be suppressed effectively. Moreover, the holes 27 are smaller in number and larger in size than the openings 25 of the first embodiment, and thus the production of the rotor core 20B is easy.

Fourth Embodiment

Next, a fourth embodiment of the present invention will be described. The fourth embodiment is intended to suppress the demagnetization of the permanent magnets 40 in a rotor 2C in which the permanent magnets 40 are disposed in straight magnet insertion holes 28.

Figure 15:
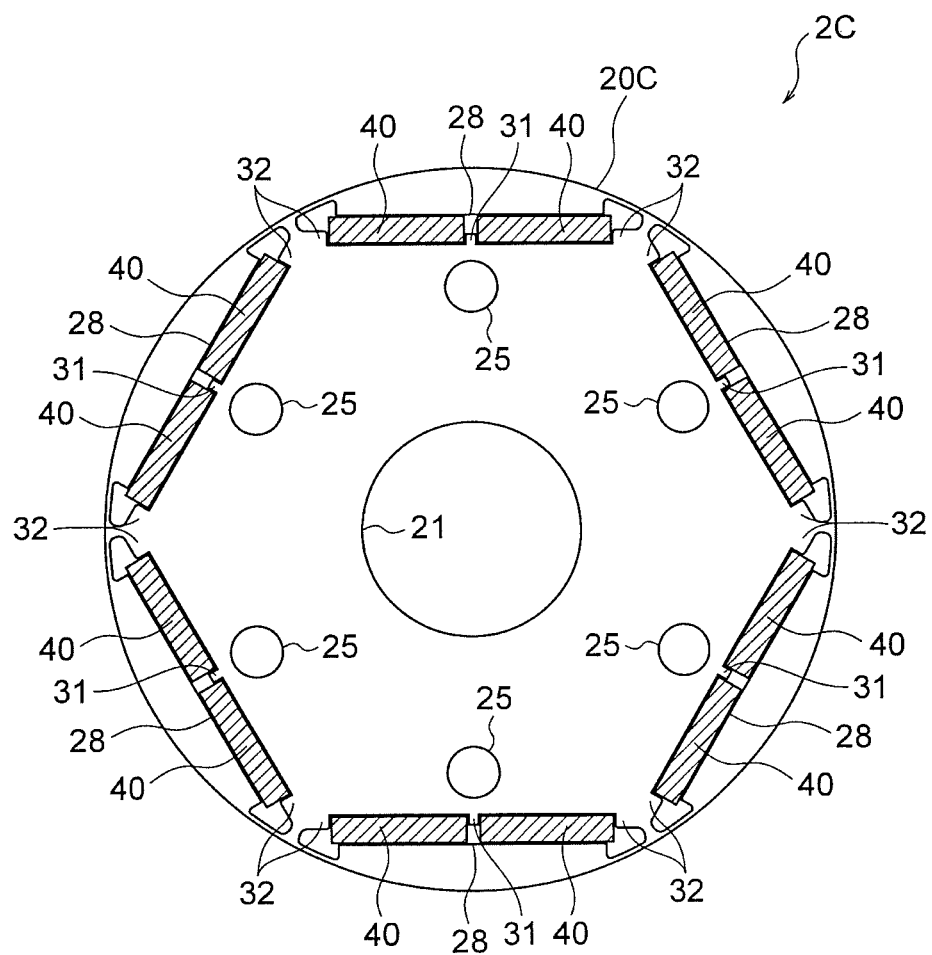
FIG. 15 is a sectional view of a rotor of a fourth embodiment.
Figure 16:
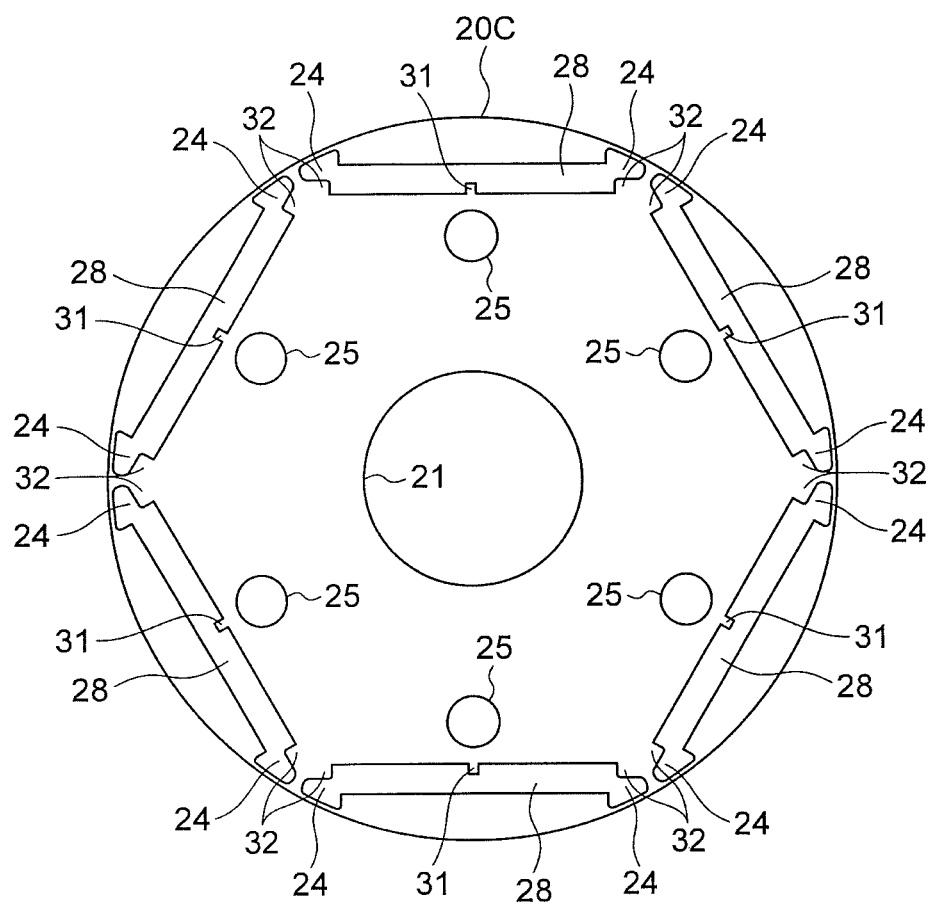
FIG. 16 is a sectional view of a rotor core of the fourth embodiment.

FIG. 15 is a sectional view of the rotor 2C of the fourth embodiment. FIG. 16 is a sectional view of a rotor core 20C of the fourth embodiment.

The rotor 2C of the fourth embodiment includes a plurality of (here, six) magnet insertion holes 28 arranged in the circumferential direction. The magnet insertion hole 28 differs from the V-shaped magnet insertion hole 22 of the first embodiment in that the magnet insertion hole 28 extends straight along an outer circumference of the rotor core 20C. Each magnet insertion hole 28 corresponds to one magnetic pole. An extending direction of the magnet insertion hole 28 is perpendicular to a radial direction of the rotor core 20C at a center of the magnetic pole. Two permanent magnets 40 are disposed in the magnet insertion hole 28.

The magnet holding portions 31 and 32 are provided at the center portion and the end portions of the magnet insertion hole 28 in the circumferential direction. The flux barriers 24 are provided on both sides of the magnet insertion hole 28 in the circumferential direction. Moreover, the opening 25 is provided so as to face the radially inner side of the first magnet holding portion 31. Configurations of the magnet holding portions 31 and 32, the flux barriers 24, and the openings 25 are as described in the first embodiment.

Since the opening 25 is disposed on the radially inner side of the first magnet holding portion 31, the magnetic resistance through the first magnet holding portion 31 increases, and the magnetic flux is less likely to flow through the first magnet holding portions 31 as described in the first embodiment. Thus, the demagnetization of the permanent magnets 40 can be suppressed.

The motor of the fourth embodiment is configured in a similar manner to the motor 100 described in the first embodiment, except for the configuration of the rotor core 20C. Moreover, the motor of the fourth embodiment can be used in the rotary compressor 300 (FIG. 9) and the refrigeration and air conditioning apparatus 400 (FIG. 10) described in the first embodiment.

As described above, according to the fourth embodiment of the present invention, the opening 25 is disposed on the inner side of the first magnet holding portion 31, the magnetic resistance through the first magnet holding portion 31 increases, and thus the magnetic flux is less likely to flow through the first magnet holding portions 31 even in a configuration in which the rotor core 20C has the straight magnet insertion holes 28. As a result, the demagnetization of the permanent magnets 40 due to the magnetic flux flowing into the permanent magnets 40 from the first magnet holding portions 31 can be suppressed. Moreover, the refrigerant of, for example, the compressor is allowed to pass through the openings 25 to cool the rotor core 20C and the permanent magnets 40. Therefore, the demagnetization of the permanent magnets due to a decrease in coercivity under high temperature can be suppressed.

Incidentally, the holes 26 described in the second embodiment may be added to the rotor core 20C of the fourth embodiment, and the openings 25 of the rotor core 20C of the fourth embodiment may be replaced with the holes 27 described in the third embodiment.

Although the preferred embodiments of the present invention have been described specifically, the present invention is not limited to the above described embodiments, but may be improved or modified variously within a range not departing from the spirit of the present invention.

For example, in each of the above embodiments, the rotor 2 (2A, 2B, 2C) has six magnet insertion holes 22 (28), but the number of magnet insertion holes can be changed as appropriate according to the number of magnetic poles of the rotor 2.

Moreover, the compressor that uses the motor 100 of each of the above embodiments is not limited to the rotary compressor 300 described with reference to FIG. 9, but may be a compressor of any other type. Moreover, the refrigeration and air conditioning apparatus using the motor 100 is not limited to the refrigeration and air conditioning apparatus 400 described with reference to FIG. 10.

What is claimed is:

1. A motor comprising a stator and a rotor provided inside the stator,
the rotor comprising:
a rotor core having two a-magnet insertion hole holes, and
two permanent magnets disposed in each magnet insertion hole,
wherein the rotor core has:
a first magnet holding portion disposed between the two permanent magnets and holding the two permanent magnets in each magnet insertion hole;
two openings each of which is disposed on an inner side of the first magnet holding portion in a radial direction of the rotor core, the opening penetrating the rotor core in an axial direction of the rotor core, and
a center hole disposed at a center of the rotor core in the radial direction,
wherein a distance from each opening to the magnet insertion hole is shorter than or equal to 3 mm, and is shorter than a distance from the opening to the center hole;
wherein the two openings form a continuous hole in a circumferential direction of the rotor core.

2. The motor according to claim 1, wherein the rotor core has two second magnet holding portions disposed at the both end portions of the magnet insertion hole in the circumferential direction, each of the two second magnet holding portions holding a corresponding one of the two permanent magnets.

3. The motor according to claim 1, wherein the rotor core has a plurality of electromagnetic steel sheets stacked in an axial direction, and
wherein the distance from the opening to the magnet insertion hole is greater than or equal to a thickness of one electromagnetic steel sheet.

4. The motor according to claim 1, wherein the opening crosses a line connecting a point shifted in a direction of a width of one permanent magnet of the two permanent magnets by 5% of the width from an end portion of the one permanent magnet on the first magnet holding portion side and the center of the rotor core in the radial direction, and
wherein the opening also crosses a line connecting a point shifted in a direction of a width of the other permanent magnet by 5% of the width from an end portion of the other permanent magnet on the first magnet holding portion side and the center of the rotor core in the radial direction.

5. The motor according to claim 1, wherein the magnet insertion hole extends straight.

6. The motor according to claim 1, wherein each of the two permanent magnets is a rare earth magnet containing neodymium (Nd), iron (Fe) and boron (B) as principal components, and exhibits a residual magnetic flux density in a range from 1.27 T to 1.42 T at 20° C. and a coercivity in a range from 1671 kA/m to 1922 kA/m at 20° C.

7. The motor according to claim 1, wherein the opening has a circular shape.

8. The motor according to claim 1, wherein the rotor core further has another opening disposed between the opening and the center hole.

9. The motor according to claim 1, wherein the first magnet holding portion protrudes in the radial direction of the rotor core from an inner surface of the magnet insertion hole.

10. The motor according to claim 1, wherein the first magnet holding portion is disposed on an inner side of the magnet insertion hole in the radial direction of the rotor core.

11. The motor according to claim 1, wherein the magnet insertion hole has a V-shape such that a center portion in a circumferential direction of the rotor core protrudes inward in the radial direction with respect to both end portions in the circumferential direction, and
wherein the opening is disposed at a position facing an apex of the V-shape.

12. The motor according to claim 11, wherein the opening is disposed on a straight line connecting a center of the magnet insertion hole in the circumferential direction and the center of the rotor core.

13. A rotor comprising:
a rotor core having two a-magnet insertion hole holes, and
two permanent magnets disposed in each the magnet insertion hole,
wherein the rotor core has:
a first magnet holding portion disposed between the two permanent magnets and holding the two permanent magnets in each magnet insertion hole;
two openings each of which is an opening disposed on an inner side of the first magnet holding portion in a radial direction of the rotor core, the opening penetrating the rotor core in an axial direction of the rotor core, and
a center hole disposed at a center of the rotor core in the radial direction,
wherein a distance from each the opening to the magnet insertion hole is shorter than or equal to 3 mm, and is shorter than a distance from the opening to the center hole;
wherein the two openings form a continuous hole in a circumferential direction of the rotor core.

14. A compressor comprising a motor and a compression mechanism driven by the motor,
the motor comprising a stator and a rotor provided inside the stator,
the rotor comprising:
a rotor core having two a-magnet insertion hole holes, and
two permanent magnets disposed in each the magnet insertion hole,
wherein the rotor core has:
a first magnet holding portion disposed between the two permanent magnets and holding the two permanent magnets in each magnet insertion hole;
two openings each of which is disposed on an inner side of the first magnet holding portion in a radial direction of the rotor core, the opening penetrating the rotor core in an axial direction of the rotor core, and
a center hole disposed at a center of the rotor core in the radial direction,
wherein a distance from each opening to the magnet insertion hole is shorter than or equal to 3 mm, and is shorter than a distance from the opening to the center hole;
wherein the two openings form a continuous hole in a circumferential direction of the rotor core.

15. A refrigeration and air conditioning apparatus comprising a compressor, a condenser, a decompression device and an evaporator,
the compressor comprising a motor and a compression mechanism driven by the motor,
the motor comprising a stator and a rotor provided inside the stator,
the rotor comprising:
a rotor core having two magnet insertion holes, and
two permanent magnets disposed in each magnet insertion hole,
wherein the rotor core has:
a first magnet holding portion disposed between the two permanent magnets and holding the two permanent magnets in each magnet insertion hole;
two openings each of which is an disposed on an inner side of the first magnet holding portion in a radial direction of the rotor core, the opening penetrating the rotor core in an axial direction of the rotor core, and
a center hole disposed at a center of the rotor core in the radial direction,
wherein a distance from each the opening to the magnet insertion hole is shorter than or equal to 3 mm, and is shorter than a distance from the opening to the center hole;
wherein the two openings form a continuous hole in a circumferential direction of the rotor core.

\* \* \* \* \*